United States Patent

[11] 3,590,967

| [72] | Inventors | Sadayuki Kajitani;<br>Masahiro Yokoyama; Katsuhiko Eguchi, all of Nagoya, Japan |
|---|---|---|
| [21] | Appl No. | 839,403 |
| [22] | Filed | July 7, 1969 |
| [45] | Patented | July 6, 1971 |
| [73] | Assignee | Mitsubishi Denki Kabushiki Kaisha<br>Tokyo, Japan |
| [32] | Priority | July 9, 1968 |
| [33] | | Japan |
| [31] | | 43/58316 |

[54] MAIN CLUTCH WITH ELECTRIC AUXILLIARY CLUTCH AND BRAKE
2 Claims, 2 Drawing Figs.

[52] U.S. Cl.................................................. 192/18 B,
192/48.2, 192/145
[51] Int. Cl......................................................... F16d 67/06

[50] Field of Search........................................ 192/12.2, 18.2

[56] References Cited
UNITED STATES PATENTS

| 3,174,450 | 3/1965 | Becker et al.................. | 192/18.2 X |
| 3,473,639 | 10/1969 | Becker et al.................. | 192/18.2 X |
| 3,487,438 | 12/1969 | Becker et al.................. | 192/18.2 |

*Primary Examiner*—Benjamin W. Wyche
*Attorneys*—Robert E. Burns and Emmanuel J. Lobato ABSTRACT: A main clutch engages a flywheel on a motor to drive an output shaft at a high speed. To decelerate the shaft, the main clutch disengages from the flywheel while simultaneously an electromagnet is energized to engage an auxiliary clutch with a flywheel. That clutch drives the main clutch through a brake disc with slip permitted between the main clutch and disc. When the electromagnet is deenergized the auxiliary clutch disengages from the flywheel and engages a brake shoe resulting in its stoppage.

MAIN CLUTCH WITH ELECTRIC AUXILLIARY CLUTCH AND BRAKE

BACKGROUND OF THE INVENTION

This invention relates to a clutch motor, and more particularly to improvements in a clutch motor suitable for use with a fixed point stop mechanism.

In the conventional type of clutch motors referred to, it has been commonly practiced to stop the associated driven machine at its predetermined position after the machine has first decelerated to a low speed and then a predetermined position where the machine is to stop has been determined. Therefore the clutch motors of conventional construction have necessarily included a speed reduction mechanism leading to the disadvantages that the motors are complicated in construction and high in manufacturing costs while the response time becomes large.

SUMMARY OF THE INVENTION

Accordingly it is an object of the invention to eliminate the above-mentioned disadvantages.

It is another object of the invention to provide a new and improved clutch motor for driving a driven machine, in which the machine can be decelerated to a suitable low speed by a unique combination of clutch and brake means and electromagnetic means and then stopped at its predetermined position in accordance with a signal from a position detector for the driven machine operatively coupled to the electromagnetic means.

The invention accomplishes these objects by the provision of a clutch motor comprising an electric motor including a rotary shaft, a flywheel directly mounted on the rotary shaft, an output shaft, a main clutch wheel on the output shaft capable of engaging the flywheel to transmit the rotational movement of the rotary shaft to the output shaft, a brake disc engaging the main clutch wheel when the latter wheel is in disengagement from the flywheel, electromagnet means energizable when the brake disc is in engagement with the main clutch wheel, a fixed brake member and an auxiliary clutch wheel, characterized in that the auxiliary clutch wheel engages the flywheel to be rotated along with both the brake disc and the main clutch wheel during the energization of the electromagnet means and disengages from the flywheel and engages the fixed brake member to constrain the operation of the brake disc and the main clutch wheel during the deenergization of the electromagnetic means.

A preferred embodiment of the invention may comprise an electric motor including a rotary shaft, a flywheel rigidly mounted on said rotary shaft at one end, an output shaft disposed in axially aligned relationship with said rotary shaft for limited longitudinal movement, a main clutch wheel rigidly mounted on said output shaft at that end adjacent the rotary shaft and normally spaced away from the flywheel, an operating lever operatively connected to the output shaft to move it toward and away from the rotary shaft of the electric motor to engage and disengage the main clutch wheel with and from the flywheel, a brake disc concentric with the output shaft and normally engaging said main clutch wheel, an auxiliary clutch wheel concentric with the output shaft and normally spaced away from said flywheel, brake shoe normally engaging said auxiliary clutch wheel, a spring loaded push plate movable axially of the output shaft, and electromagnet means energizable when the main clutch wheel is in disengagement from the flywheel, the electromagnet means, when energized, being operative to move the push plate toward the auxiliary clutch wheel whereby the latter wheel disengages from the brake shoe and engages the flywheel to transmit the rotational movement of the rotary shaft through the same, the brake disc and the main clutch wheel to the output shaft with the brake disc permitted to slide along the main clutch wheel, the deenergization of the electromagnet means causing the auxiliary clutch wheel to disengage from said flywheel and engage the brake shoe to stop the auxiliary clutch wheel and therefore the output shaft.

BRIEF DESCRIPTION OF THE DRAWING

The invention will become more readily apparent from the following detailed description taken in conjunction with the accompanying drawing in which.

DESCRIPTION OF THE PREFERRED EMBODIMENT

Figure 1:
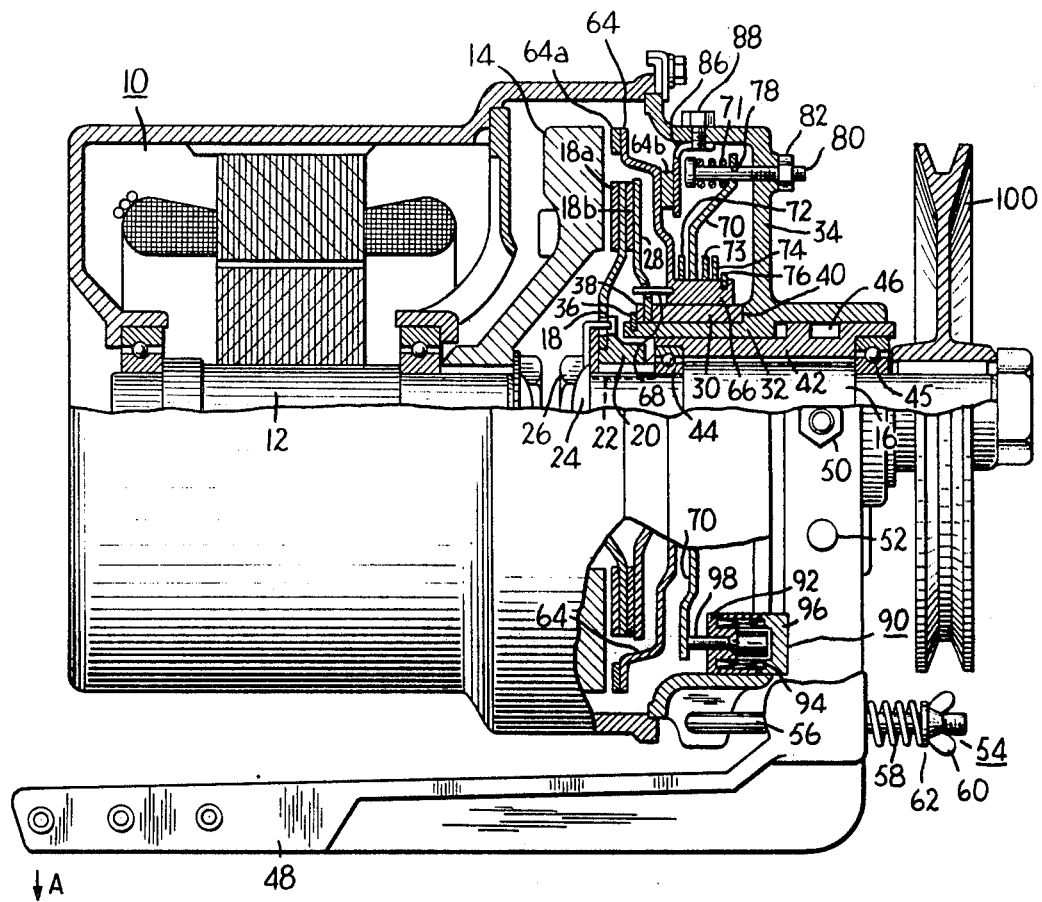
FIG. 1 is an elevational view, partly in longitudinal section of a clutch motor constructed in accordance with the principles of the invention with the upper half illustrated in vertical longitudinal section and with the lower cutaway portion illustrated in horizontal longitudinal section.

Referring now to the drawing and FIG. 1 in particular, it is seen that an electric motor of conventional construction generally designated by the reference numeral 10 includes a rotary shaft 12 having rigidly secured to one end thereof a flywheel 14 exhibiting an inertia effect. An output shaft 16 is disposed in axially aligned relationship with the rotary shaft 12 and has a main clutch wheel 18 fixed on that end portion thereof adjacent the rotary shaft 16. More specifically, the main clutch wheel 18 has its hub portion 20 fitted onto and fixed to the said end portion of the output shaft 16 through a key 22 and a washer 24 by a nut 26 screw-threaded onto the end portion of the shaft 16. The main clutch wheel 18 is provided on the opposite surfaces of the outer peripheral portion with a pair of opposite friction annuli 18a, and b, respectively. One of the friction annuli 18a faces the operating surface of the flywheel 14 to normal form a gap therebetween and the other friction annulus 18b, normally engages a brake disc 28. The brake disc 28 has its hub portion 30 fitted onto a hollow cylindrical portion 32 extending from the central portion of a bracket 34 toward the motor 10 and coaxially encircling the output shaft 16. The brake disc 28 is arranged to be rotatable with respect to the central cylindrical portion 32 and prevented from moving axially of that portion 32 by having a retaining ring 36 disposed in a circumferential groove provided in that end portion of the central cylindrical portion 32 near to the main clutch wheel 18 to abut against the adjacent surface of the brake hub portion 30 through a washer 38 with a thrust pad 40 interposed between the other end of the hub portion 30 and the adjacent portion of the bracket 34. Thus the main clutch wheel 18 is disposed between the operating surface of the flywheel 14 and the friction surface of the brake disc 28 so as to be engageable by either one of these surfaces at a time by means as will be described hereinafter.

A sleeve-type movable bearing 42 is slidably fitted into the hollow cylindrical portion 32 of the bracket 34 and also rotatably carries the output shaft 16 through a pair of spaced ball bearings 44 and 45. The sleeve type bearing 42 is provided on that end portion remote from the brake disc 28 with a circumferential recess 46.

An operating L-shaped lever generally designated by the reference numeral 48 is disposed externally of a housing for the clutch motor and engaged at the forked end by the recess 46 on the sleeve-type movable bearing 42 through a pair of opposite yoke screws 50. The operating lever 48 is adapted to rock about the axis of a pivot pin 52 on one arm of the "L" suitably fixed to the bracket 34 to move the sleeve-type bearing 42 toward and away from the rotary motor shaft 12 for the purpose that will be apparent hereinafter. The operating lever 46 further comprises a spring operated reset mechanism generally designated by the reference numeral 54 including an L-shaped pull rod 56 suitable fixed at one end of one leg thereof to the bracket 34, a compression spring 58 disposed around the other leg thereof, and an adjusting butterfly nut 60 engaging the free end portion of the other leg of the rod 56 to push the spring 58 against the lever 48 through a washer 62.

As shown in FIG. 1, an auxiliary clutch wheel 64 includes a hub portion 66 fitted onto the hub portion 30 of the brake disc 28 for limited axial movement. The auxiliary clutch wheel 64 has a plurality of retaining pins 68 planted at substantially equal angular intervals on that surface of its hub adjacent the brake disc 28 and extending through the latter so as to be prevented from rotating with respect to the brake disc 28. The auxiliary clutch wheel 64 includes an outer peripheral portion surrounding and spaced away from the outer periphery of main clutch wheel 18 with a friction annulus 64a, attached to that surface thereof facing the operating surface of the flywheel 14 while another friction annulus 64b, is rigidly secured to the intermediate portion of the opposite surface.

An annular push plate 70 is rotatably supported by the hub portion 66 of the auxiliary clutch wheel 64 through a pair of opposite thrust needle bearings 72 and 73, a washer 74 and a retaining ring 76 partially embedded in the hub portion 66 with the inner periphery of the annular plate 70 interposed between the thrust bearings 72 and 73. Thus the push plate 70 is disposed on the hub portion 66 of the auxiliary clutch wheel 64 for axial movement with respect thereto. The push plate 70 is operatively coupled to a spring-loaded brake actuation unit generally designated by the reference numeral 78. This unit 78 includes a spring adjusting rod 80 having one end portion screw-threaded into the bracket 34 and fastened to the latter by a locknut 82 and loosely extending through the push plate 70, and a compression spring 71 disposed around the rod 80 between the other end thereof and the push plate 70. A stationary brake shoe 86 is shown in FIG. 1 as being secured to the bracket 34 by bolt and nut means 88. The brake shoe 86 normally engages the friction annulus 64b on the auxiliary clutch wheel 64. Further an electromagnet unit generally designated by the reference numeral 90 in FIG. 1 fixedly extends through the bracket 34 and includes a hollow stationary iron core 92, having an exciting winding 94 disposed inside the same, a cap 96 closing one end of the hollow iron core 92, and a movable iron core 98 movably disposed within the stationary core. The movable iron core 98 has one end portion projecting beyond the other end of the stationary core 92 to contact the push plate 70.

Figure 2:
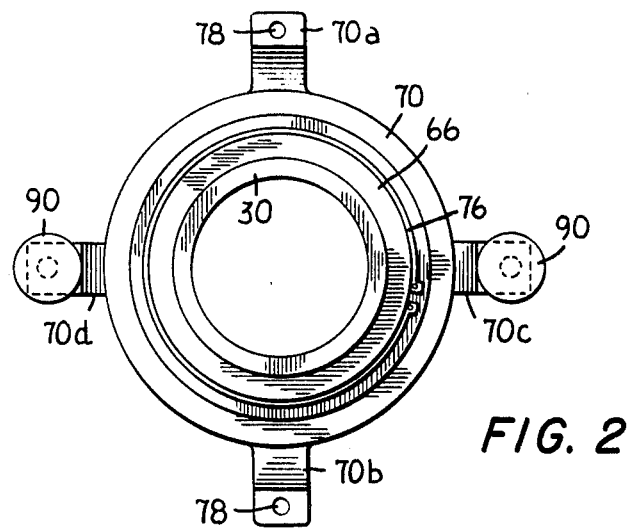
FIG. 2 is a diagrammatic front plan view of one portion of the combined clutch and brake mechanism shown in FIG. 1 as viewed on the output side.

FIG. 2 illustrates the positional relationship between the annular push plate 70 and the brake actuation unit and electromagnet unit 78 and 90 respectively. As shown in FIG. 2 a pair of the brake units 78 are disposed in diametrically opposite relationship as are a pair of the electromagnet units 90 with all the units disposed at substantially equal angular intervals equal to 90°. The two rods 80 loosely extend through a pair of diametrically opposite ears 70a and b of the push plate 70 and the two movable iron cores 98 contact another pair of diametrically opposite ears 70c and d of the push plate spaced from the ears 70a and b by angular intervals substantially equal to 90°.

In operation the motor continues to be rotated. If the operating lever 48 is pulled in the direction of the arrow A shown in FIG. 1 and against the action of the reset spring 58 then the yoke screws 50 on the one end of the lever 48 are rotated about the axis of the pin 52 to move the main clutch wheel 18 through the thrust bearing 44 and the hub portion 20 of the wheel 44 toward the flywheel 14 until the friction annulus 18a on the main clutch wheel 18 engages the operating surface of the flywheel 14. Thus the rotational movement of the rotary motor shaft 12 is transmitted through the flywheel 14, and the main clutch wheel 18 to the output shaft 16. A driving pulley 100 mounted on that end of the shaft 16 remote from the motor 10 is thereby rotated to drive the associated driven machine (not shown) at a high speed or the normal speed. The release of the lever 48 causes the reset spring 58 to be operated to return the lever back to its original position as shown in FIG. 1 whereupon the main clutch wheel 18 disengages from the flywheel 14 and engages the brake disc 28.

The exciting winding 94 of the electromagnet unit 90 is arranged to be externally energized by any suitable source of electric power (not shown) simultaneously with the resetting of the lever 48. The energization of the winding 94 causes the movable iron core 98 to be pulled in the left-hand direction as viewed in FIG. 1 by means of an attraction generated between the stationary and movable cores 92 and 98 respectively. The core 98 moves the push disc 70 in the left-hand direction as viewed in FIG. 1 and against the action of the compression spring 71. Therefore the auxiliary clutch wheel 64 is forced toward the flywheel 14 through the thrust roller bearing 72 until the friction annulus 64a on the clutch wheel 64 engages the operating surface of the flywheel 14 while the other friction annulus 64b on the same wheel disengages from the brake shoe 86. Therefore the rotational movement of the rotary motor shaft 12 is now transmitted through the flywheel 14, the auxiliary clutch wheel 64, the retaining pins 68, the brake disc 28 and the main clutch wheel 18 to the output shaft 16. Under these circumstances, the main clutch wheel 18 is driven by the auxiliary clutch wheel 64 through the brake disc 28 while the brake disc is permitted to slide along the main clutch wheel. That is, the main clutch wheel 18 is put in the partly clutched mode of operation. Therefore the output shaft 16 and hence the driven machine (not shown) is driven at a low speed. Then the particular position where the driven machine is to stop can be detected by any suitable position detector (not shown) operatively coupled to the machine. Upon detecting that position, the electromagnet unit 90 is deenergized to permit the auxiliary clutch wheel 64 to return back to its original position by the action of the compression spring 71, whereupon the friction annulus 64b on the auxiliary clutch wheel 64 engages the stationary brake shoe 86. The brake shoe 86 applies the braking action to the auxiliary clutch wheel 64 to stop it. Accordingly the driven machine will stop at that detected position.

In summary, the invention is characterized in that the auxiliary clutch wheel is arranged to be movable between the flywheel and the brake shoe and can be started and stopped regardless of the operation of the operating lever. The auxiliary clutch wheel is particularly effective for facilitating control of the partly clutching operation and the compensation for any wear of the friction annuli. Also as the auxiliary clutch wheel is required only to be driven at the stage of adjusting the position of the driven machine the long useful life of the present mechanism is ensured. Further the unique combination of the friction annuli, spring loaded brake actuation unit and electromagnet unit makes it possible to stop the associated driven machine at its predetermined position without the necessity of providing any speed reduction gearing.

While the invention has been illustrated and described in conjunction with a single preferred embodiment thereof it is to be understood that various changes and modifications may be resorted to without the departing from the spirit and scope of the invention. For example, the mechanically braking application as above described may be replaced by any electrically braking application to the auxiliary clutch wheel.

What we claim is:

1. In a clutch motor, the combination of an electric motor including a rotary shaft, a flywheel directly mounted on said rotary shaft, an output shaft, a main clutch wheel on said output shaft capable of engaging said flywheel to transmit the rotational movement of the rotary shaft to the output shaft, a brake disc engaging said main clutch wheel when the latter wheel is in disengagement from said flywheel, electromagnet means energizable when said brake disc is in engagement with said main clutch wheel, a fixed brake member, and an auxiliary clutch wheel engaging said flywheel to be rotated along with both said brake disc and said main clutch wheel during the energization of the electromagnet means and disengaging from said flywheel and engaging said fixed brake member to constrain the operation of said brake disc and said main clutch wheel during the deenergization of the electromagnet means.

2. A clutch motor comprising, in combination of an electric motor including a rotary shaft, a flywheel rigidly mounted on said rotary shaft at one end, an output shaft disposed in axially aligned relationship with said rotary shaft for limited longitudinal movement, a main clutch wheel rigidly mounted on said output shaft at that end adjacent the rotary shaft and normally spaced away from said flywheel, an operating lever operatively connected to said output shaft to move it toward and away from said rotary shaft of said electric motor to engage and disengage said main clutch wheel with and from said flywheel, a brake disc concentric with said output shaft and normally engaging said main clutch wheel, an auxiliary clutch wheel concentric with said output shaft and normally spaced away from said flywheel, a brake shoe normally engaging said auxiliary clutch wheel, a spring-loaded push plate movable axially of the output shaft, and electromagnet means energizable when said main clutch wheel is in disengagement from said flywheel, said electromagnet means, when energized, being operative to move said push plate toward said auxiliary clutch wheel whereby the latter wheel disengages from said brake shoe and engages said flywheel to transmit the rotational movement of the rotary shaft through the same, the brake disc and the main clutch wheel to the output shaft with said brake disc permitted to slide along the main clutch wheel, the deenergization of said electromagnet means causes said auxiliary wheel to disengage from said flywheel and engage said brake shoe to stop the auxiliary clutch wheel and therefore the output shaft.